Figure 1:
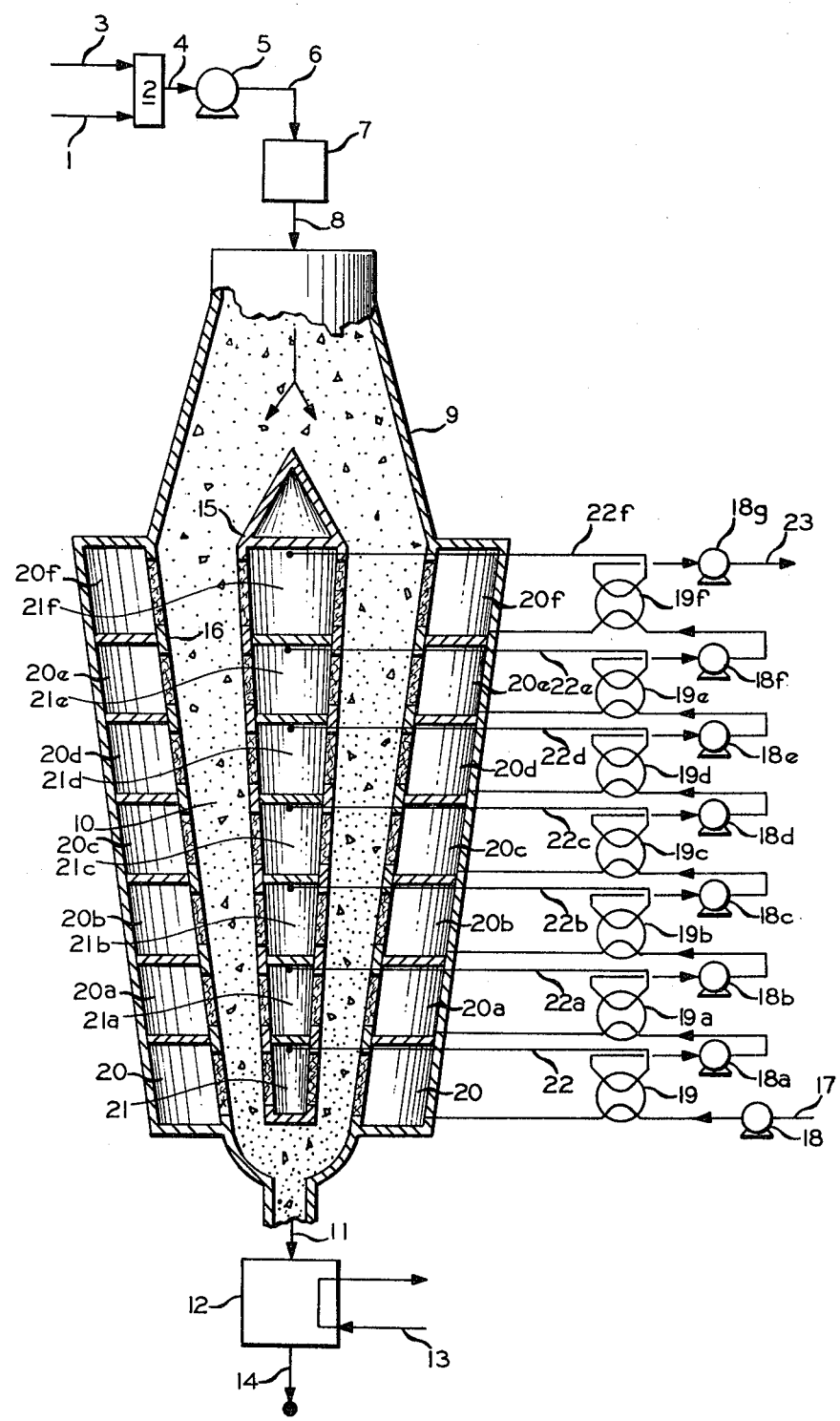

United States Patent [19]

Warzel

[11] 4,397,731
[45] Aug. 9, 1983

[54] DISCHARGE OF SOLIDS

[75] Inventor: F. Morgan Warzel, Bartlesville, Okla.

[73] Assignee: Phillips Petroleum Company, Bartlesville, Okla.

[21] Appl. No.: 282,770

[22] Filed: Jul. 13, 1981

[51] Int. Cl.³ .............................................. C10G 1/04
[52] U.S. Cl. .................................. 208/8 LE; 137/12; 340/626; 414/217
[58] Field of Search .................... 222/55, 56; 340/626; 414/221; 208/8 LE, 11 LE; 251/63.5; 137/12, 492

[56] References Cited

U.S. PATENT DOCUMENTS

| | | | |
|---|---|---|---|
| 2,931,765 | 4/1960 | Glinka | 208/8 LE |
| 3,173,852 | 3/1965 | Smith | 208/131 |
| 3,607,716 | 9/1971 | Roach | 208/8 LE |
| 3,963,599 | 6/1976 | Davitt | 208/11 LE |
| 3,977,423 | 8/1976 | Clayton | 137/12 |

OTHER PUBLICATIONS

T. C. Aude, N. T. Couper, T. L. Thomson and E. J. Wasp; "Slurry Piping Systems: Trends, Design Methods, Guidelines", Chemical Eng., vol. 78, pp. 74–90, Jun. 28, 1971.
Brodesell, "Valve Selection", Chem. Eng./Deskbook issue, Oct. 11, 1971, pp. 119–121.

Primary Examiner—Delbert E. Gantz
Assistant Examiner—Glenn A. Caldarola

[57] ABSTRACT

Finely divided particulate solids are discharged from a high pressure zone to a low pressure zone, e.g. to atmospheric pressure, by passing a dense bed of this particulate material through a long discharge channel and past a throttle element. The pressure drop across the throttle element is significantly reduced due to the fact that the moving dense bed in the discharge channel dissipates the pressure drop along this channel leaving only a small pressure drop to be achieved across the throttle element.

13 Claims, 3 Drawing Figures

DISCHARGE OF SOLIDS

This invention relates to a process and an apparatus for discharging solids from a zone in which the solids are present under high pressure. More specifically, this invention relates to a process and apparatus for discharging high pressure particulate solid material coming from a supercritical extraction zone.

BACKGROUND OF THE INVENTION

Supercritical extraction of tar sands as well as oil shale are known approaches to recovery of organic materials or hydrocarbons from solids containing such material. In the case of tar sands the bitumenous organic material is accessible to solvents whereas in the case of oil shale the finely divided oil shale generally is subjected to supercritical conditions of temperature and pressure while in contact with a solvent in the order to produce extractable organic material from the kerogen in the oil shale. Another example where solids under high pressure occur is a coal conversion process, such as supercritical coal extraction.

In each instance of extraction of organic material present in solids under extremely high pressure one of the key problems that arises consists in the difficulty of discharging the high pressure solid material.

THE INVENTION

It is thus one object of this invention to provide a process for discharging mixtures of solids and fluids from a high pressure zone into a low pressure zone.

Another object of this invention is to provide an apparatus which allows the discharge of high pressure mixtures of solid particulate material containing fluid organic material.

In accordance with this invention a solids discharge is provided for wherein the high pressure is reduced at least to a significant part by the frictional engagement of the particulate solids with a discharge channel.

More specifically, in accordance with this invention there is provided a process to discharge a mass of particulate solids from a high pressure zone. In this process these solid particles are introduced from the high pressure zone into the discharge channel. In the discharge channel a dense bed of these solid particles is established so that the moving bed is exposed to considerable frictional contact between the bed and the channel walls. The discharge channel is in open and fluid communication with the high pressure zone. The dense bed of the solid particles is moved through the channel and released from the output end of the discharge channel across a throttle element into a zone of significantly reduced pressure as compared to the pressure in the high pressure zone.

Preferably, the discharge channel has circular cylindrical cross section and has a length which is at least several times as large as its diameter. It is within the scope of this invention that the discharge channel is slightly tapered, e.g. in the range of 0.5° to 5° for the half angle. In this embodiment, the tapering is such that the diameter of the discharge channel becomes slightly smaller in the direction of the flow of the particulate solid mass. Generally, the ratio of the length of the discharge channel to the diameter thereof—or in the case of the slight taper to the average diameter—is in the range of 20–1,000.

In the discharge system of this invention it is presently preferred that the throttle element mentioned is a moveable plug. Advantageously, the plug is hydraulically moveable and the hydraulic system utilized is capable of withstanding a pressure in the discharge channel as high as that in the high pressure zone. This ability is particularly important for start up operations and upsets.

In accordance with a further embodiment, the pressure in the discharge channel is measured at one or more locations. One or more corresponding pressure signals are generated. These pressure signals are converted into control signals and responsive to the pressure signal the plug or throttle element is controlled in its position in order to maintain a given pressure at a given location of the channel.

The present invention is particularly useful in connection with processing oil shale by supercritical extraction. In such a process it is necessary to discharge large quantities of solids (spent shale) from a high pressure region, in which the supercritical extraction has taken place for instance at a pressure of 1,500 psig. The discharge of the spent solids is preferably done into a zone of atmospheric pressure and the spent solids are utimately disposed for instance in a canyon. The present invention allows the discharge of these solids with a small pressure drop across the throttle element as compared to withdrawing the slurry across a throttle with the entire high pressure being reduced in this throttle or valve. The present invention therefore allows a very significant reduction of the erosion of the valve or throttle that otherwise occurs.

In a preferred process the slurry comprising solids and organic fluid is first passed through a filtration zone wherein fluid material is removed from such a mixture. Thereby, a tightly packed bed of solid particles is formed and the only remaining fluid is the fluid remaining in the "pores" of the solid bed, i.e. between the solid particles that are in contact with each other forming the solid bed. The solid bed is permitted to move slowly down the length of the discharge channel and to finally discharge controlled by the moveable plug as described. The large pressure drop between the high pressure zone and the low pressure zone to which the material is discharged is dissipated by the frictional resistance of the solid particle bed structure against the walls of the conduit. Only the remaining part of the pressure drop is to be dissipated by the solid particle bed structure against the moveable throttle element or plug. This throttle element or plug is kept at a position to prevent the bed from blowing out due to loss of "structure" or otherwise.

The discharge conduit can be made relatively large in diameter for a given discharge capacity and the solids velocity through the discharge channel may be low, for instance in the order of 0.03 to 3 feet per second linear bed velocity in axial direction of the discharge conduit. The erosion of the throttle element will be greatly reduced as compared to a throttle valve used for discharge of the slurry directly from the high pressure zone in the atmosphere. There will be a certain amount of abrasion in the discharge channel but this discharge channel is subjected to such mechanical attack over a large area and the need to replace the channel is therefore likely to occur only after very long periods of operation.

It is contemplated that organic fluid associated with the solid material will flow through the dense bed of the discharge channel in view of the significant pressure drop across this discharge channel and the "porosity" of the dense bed. In order to keep the fluid discharge through the bed low it is presently preferred to operate with small particle size solids, such as spent oil shale particles, where the permeability to the fluid flow is low and correspondingly the resistance toward such flow is high. The present invention is applicable to solid fluid slurries derived from such extractable solid material as coal, lignite, oil shale and tar sands. The fluid associated with the at least partially extracted solids is generally composed of a significant amount of solvent and extracted organic material. Preferably, the discharge of the mixture is done at a temperature somewhat above the boiling point at the discharge pressure of the solvent associated with the solids. By this operation solvent will flash at the discharge point and can be readily separated as a sovlent vapor from the solids discharged. The solvent vapor can e.g. after heat exchange, be reused in an upstream portion of the process.

Figure 2:
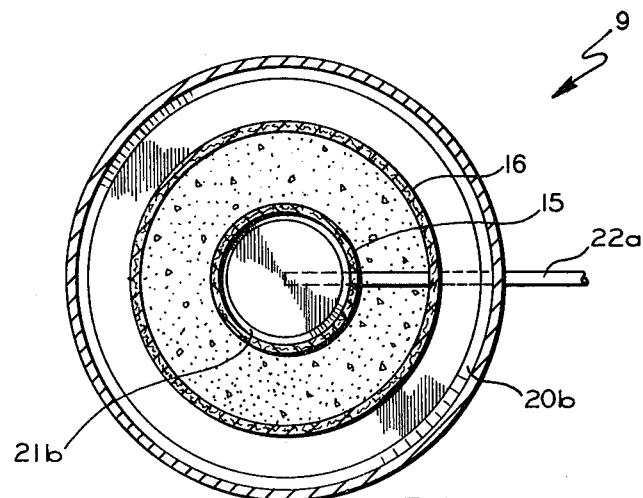

FIGS. 1 and 2 show two cross sectional views of the extractor of this invention together with a schematic representation of the overall process.

The following description is made specifically with respect to the extraction of oil shale, but it is to be understood that the extraction method can be used in connection with other solids containing extractable, soluble materials. Crushed oil shale, preferably ground to a practical particle size is introduced via line 1 into a mixing zone 2. Solvent, e.g. toluene, is introduced via line 3 and the oil shale and the solvent are mixed in the mixing zone to form a slurry which via line 4 is passed to a pressurizing zone 5 in which the slurry is pressurized to a high pressure of e.g. 1500 psi. From the pressurizing zone 5 the slurry is passed via line 5 to a heating zone 6 wherein the slurry is brought to a temperature of about 700° to 900° F. The slurry remains under the high temperature and pressure conditions in contact with the solvent for a time in the range of 2 to 120 minutes, usually approximately 10 minutes. This time is not particularly critical and is determined more by commercial reasons than by technical requirements. In the absence of a preheating step of the oil shale, this time must be long enough to allow the decomposition of the kerogen to bitumen. The longer the oil shale is subjected to the supercritical conditions the higher the yield of recovered hydrocarbons will be.

From the heating zone 7 the slurry 8 is introduced into the extraction zone 9. The slurry in line 8 now contains solid particles as well as extractable organic material, particularly bitumen, which can be removed by an extraction process. This organic extractable material in the case of oil shale being used is the result of a conversion process of the kerogen in the oil shale hving been subjected to the solvent under supercritical conditions. The dissolved decomposition products of kerogen are washed out be the solvent crossflow process of this invention.

The mixture described enters the top of the extraction zone 9 and flows through a tapering or frustoconically shaped annular channel 10. From the extractor 9 the extracted material which now comprises solids, solvent and organic material but which is significantly depleted of such organic material as bitumen as compared to the stream entering via line 8, is passed via line 11 into a heat exchanger 12 where the mixture by means of indirect heat exchange heats a fluid introduced via line 13 into the indirect heat exchanger 12. This fluid can for instance be fresh solvent used in the extractor 9. From the heat exchanger 12 the cooled mixture of solids and solvent is withdrawn via line 14 and is recovered via a pressure reduction system. Such a pressure reduction system will be described in further detail in connection with FIG. 3.

The multistage extraction apparatus of this invention comprises a staged contactor adapted to the washing of fine, free filtering solids which is capable of being operated at high pressures. The contactor has no moving parts in the high pressure region. Macroscopically the contactor is shown in FIG. 1 to be operated in a countercurrent way. The individual contacting stage of the contactor exposes the mixture to be extracted with a replacement fluid essentially in a cross flow operation wherein the direction of flow of the mixture and the direction of flow of the replacement fluid are roughly at right angles.

The frustoconically shaped annulus 10 is confined between two also frustoconically shaped walls 15 and 16 made of filtering material. This filtering material can for instance be sintered stainless steel and the material can be segmented to create stages. Fresh solvent via line 17 is pumped by means of pump 18 and a four way valve 19 into the other chamber 20 annularly surrounding the first extraction of replacement zone. The fresh fluid flows through the filter walls and the material to be extracted between those walls in a cross flow relationship to the flowing solids. The fluid leaves the annulus 10 in the first stage via the inner chamber 21 and is passed by means of line 22 and the four way valve 19 to the pump 18a for the next stage. Similarly, the fluid which is gradually enriched in every stage in the content of extractable organic materials is moved by means of pumps 18a–g through four way valves 19a–f, outer chambers 20a–f, the extractable material in the channel, inner chambers 21a–f and leaving the respective inner zones via lines 22a –f, macroscopically in a countercurrent flow until a fluid containing the highest content of organic material in the solvent is finally removed via line 23 from pump 18g.

Each pump 18, 18–g is designed to be capable of restoring the pressure of the fluid injected into the annular space 10. Each pump thus only has to be capable of pressurizing the fluid to a pressure differential between the inlet and the outlet side of the pump which equals or slightly surpasses the pressure drop of the fluid across the annulus 10.

The four way valves 10, 19a–f are designed to allow the reversal of the flow through the respective portion of the annulus 10. These valves 19, 19a–f are four way valves and the drawings schematically show the operation. Preferably the valves 19, 19a–f are turned to reverse the fluid flow simultaneously so that all the fluids either flow form the outside to the inside or from the inside to the outside of the annulus 10.

In the drawing, seven sequential replacement zones of channel 10 are shown. Preferably, the number of replacement zones is between 3 and 12.

Figure 3:
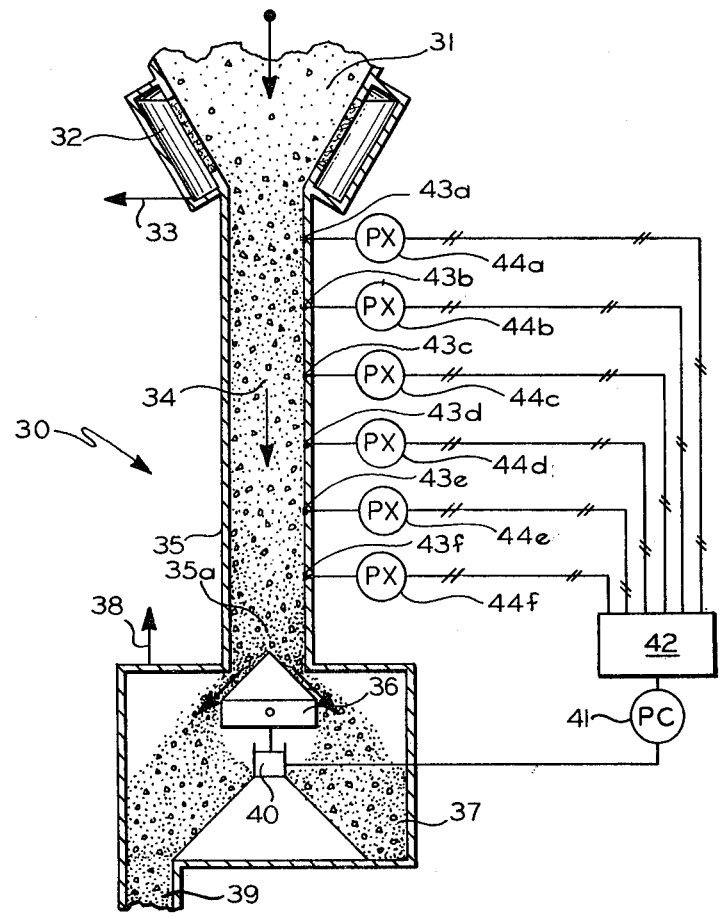

FIG. 3 schematically shows a cross sections of the discharge zone 30. The mterial from the extraction zone enters a filter area 31 where any excess fluid is removed via an annular channel 32 and line 33. The solid material leaving the filter zone 31 is rather tightly packed bed 34. The only remaining fluid between the solid particles is that in the empty spaces between the solid particles of this bed. The bed moves through a conduit 35 having a large length/diameter ratio, for instance in the range of 20:1 to 1000:1. The solid particle bed is allowed to move slowly down the length of the conduit 35 and to discharge against and to be restrained by a movable plug 36. The pressure drop from the high pressure region 31 to atmospheric pressure is thereby largely dissipated by the frictional resistance of the bed structure against the walls of the conduit 35. The remaining part of the pressure drop to be dissipated is released by the frictional contact of the bed structure against the moveable plug 36.

The temperature of the mixture leaving the pressure drop channel 35 is preferably above the boiling point of the solvent used so that the release of the mixture across plug 36 into the discharge chamber 37 causes flashing of solvent. The evaporated solvent is removed via line 38 and the collected solids are withdrawn from the separating chamber via conduit 39.

The evaporated solvent in line 38, preferably after heat exchange, is recycled as a liquid into the extraction step of line 17 or to line 3 for use as supercritical extraction solvent.

The moveable plug 36 is manipulated through a hydraulic cylinder and piston unit 40. The hydraulic piston in turn is controlled in its motion from a pressure controller 41. The pressure controller 41 is operated by means of a sensing and control system 42 which receives as input signals those signals representative of preferably a plurality of pressures sensed along the length of the discharge conduit 35. The pressure sensing units are indicated in the drawing by reference numeral 43a-f and pressure transducers 44a-44f may be present if desired. The moveable plug 36 is manipulated by the sensing and control system 42 in such a way as to prevent any blowout of the moving bed of solid particles. The moveable plug 36 as well as the hydraulic system 40 as a security measure would have the capability of withstanding the pressure present in filter zone 31, e.g. 1500 psig. Normally the plug 36 would operate against a much smaller pressure, however.

Some fluid will flow from the high pressure zone 31 to the particulate material in channel 35 and out into the release chamber 37, thus losing the high pressure required in its upstream applications. The quantity of such fluid flowing directly through the release channel depends upon the flow resistance the fluid sees during the travel through the channel 35. Therefore, the release system described is particularly desirable in the case of small particle size solids wherein the permeability to fluid flow is low and correspondingly the resistance to said flow is high. Spent oil shale is usually of a particle size where this type of discharge system will be desirable.

The conduit 35 may be slightly tapered for improved frictional contact of the bed with the conduit or better bed structure chracteristics. The conduit 35 may also be a continuation of the filter medium for additional fluids removal. It is also within the scope of this invention to control the removal of the fluids by a constant restriction for primary control of the bed flow rate, with only back up control provided by plug 36.

The following is a calculated example describing the typical operating conditions of the solids discharge.

EXAMPLE

The following figures refer to reference numerals in the attached drawing and describe a calculated typical operation of an oil shale extractor and discharger.

1. Washed solids withdrawn from contractor 9:
   140,000 lb/hr (300°F, 1500 psia);
   Compositions:
   shale solids 50 wt. %
   solvent* 49.5 wt. %
   extract* 0.5 wt. %
2. Discharge conduit 35:
   diameter 13.5 inches
   length 1800 inches (150 feet)
3. Pressure transmitter:
   number of units: 6
4. Pressure control device to receive and maintain proper conduit pressure profile through adjustment of movable plug system 40.
5. Discharge solids and some liquids:
   300°F**, 14.7 psia
6. Movable plug, travel:
   12 inches
7. Hydraulic cylinder for plug positioning.

*assumes the solids have largely been washed free of extract with fresh solvent. This need not be the case, however, insofar as the concept here presented is concerned.

**Temperature at 31 and 35a are preferably below the bubble point of the solvent-extract mixture of the respective pressure to prevent flashing.

Reasonable variations and modifications which will become apparent to those skilled in the art can be made in this invention without departing from the spirit and scope thereof.

I claim:

1. A process to discharge a mass of particulate solids mixed with fluid from a high pressure zone comprising
   (a) introducing said mass from said high pressure zone into a discharge channel at the input end thereof, said channel having essentially cylindrical or slightly frustoconical shape and being in open fluid communications with said high pressure zone, and having a length that is considerably larger than the diameter or average diameter of said discharge channel,
   (b) establishing a dense bed of said mass of particulate solids in said discharge channel, which dense bed is a tightly packed bed of solid particles touching each other thereby forming pores filled with fluid,
   (c) moving said dense bed of particulate solids in frictional contact with the walls confining said discharge channel from the input end thereof to the output end thereof, and
   (d) releasing said mass of particulate solids from the output end of said discharge channel across a throttle element into a zone of significantly reduced pressure as compared to the pressure in the high pressure zone, with the provision that the pressure drop via the throttle element is small as compared to the pressure drop along the discharge channel achieved by means of the frictional contact of the mass of particulate solids with the wall confining the discharge channel.

2. A process in accordance with claim 1 wherein said discharge channel is of circular cylindrical shape and has a length which is at least several times as large as its diameter.

3. Process in accordance with claim 1 wherein the ratio of length to diameter, or respectively average diameter, of said discharge channel is in the ange of 20–1,000.

4. Process in accordance with claim 1 wherein said throtte element is a moveable plug.

5. Process in accordance with claim 4 comprising measuring the pressure in said discharge channel at one or more locations.

generating one or more pressure signals correspondingly to the measured pressure, automatically converting said pressure signals into a control signal, and responsive to said control signal manipulating the position of said throttle element in order to maintain a predetermined relationship between the measure pressure values in said discharge channel and/or with respect to pressure set points.

6. Process in accordance with claim 1 wherein particulate inorganic solids and a fluid under high pressure are passed through a filter to allow removal of a portion of said fluid, wherein the remaining mixture of said particulate solids and said fluid is withdrawn from said filter as said mass and introduced into said discharge channel.

7. Process in accordance with claim 1 wherein said particulate solids are spent solids from an operation extracting organic materials from coal, lignite, tar sand or oil shale.

8. Process in accordance with claim 1 wherein said particle size of said particulate solids is in the range of 2 microns to ⅛-inch, the pressure of the high pressure zone is in the range of 100 to 10,000 lpsig, the discharge pressure is in the range of near atmospheric to 100 psig, and the temperature in the high pressure zone is in the range of ambient to 3500° F., and the temperature in the discharge zone is from ambient to 800° F.

9. Process in accordance with claim 1 wherein said mass of particulate inorganic solids consists essentially of extracted hydrocarbon-bearing solids having been extracted and dissolved heavy hydrocarbon having been essentially displaced by a solvent.

10. Apparatus for discharging a solid particulate material comprising
    (a) a high pressure chamber containing a mass of particulate solids mixed with fluid,
    (b) a long cylindrical or slightly frustoconical discharge channel having a ratio of length to diameter or respectively average diameter in the range of 20 to 1,000, and being connected to the outlet of said high pressure chamber as a feed means with the input end thereof and having an output end,
    (c) connected to the output end of said discharge channel a moveable throttle element,
    (d) a discharge chamber of significantly reduced pressure as compared to that in said high pressure chamber, said discharge chamber connected with the output end of said discharge channel and said throttle element allowing the material from said discharge channel to discharge via said throttle element into said discharge chamber and
    (e) a filter means located at the outlet of the high pressure chamber and upstream of said discharge channel for removal of fluid from said mass and arranged so that the solid material leaving the filter enters the inlet end of said discharge material.

11. Apparatus in accordance with claim 10 comprising a hydraulic operating means for said throttle element.

12. Apparatus in accordance with claim 11 comprising one or more pressure sensing means for sensing the pressure in said discharge channel, pressure signal generating means for generating a signal responsive to the pressure sensed by said pressure sensing means, control signal generating means associated with said pressure signal generating means for receiving said pressure signal and converting these signals into a control signal and throttle controller means associated with said control signal generator means for receiving and control signals and manipulating said throttle element responsive thereto.

13. A process to discharge a mass of particulate solids having a particle size in the range of 2 microns to ⅛-inch mixed with fluid from a high pressure zone in which the pressure is in the range of 100 to 10,000 psig and the temperature is in the range of ambient to 3500° F, said process comprising
    (a) passing said mass through a zone of fluid removal wherein a portion of said fluid is removed from said mass,
    (b) introducing the remaining mass of solid particulate material mixed with fluid in the form of a dense bed and under the high pressure into the input end of a discharge channel, said channel having essentially cylindrical or slightly frustoconical shape and being in open fluid communication with said high pressure zone, and having a length that is considerably larger than the diameter or average diameter of said discharge channel,
    (c) moving said dense bed of particulate solids in frictional contact with the walls confining said discharge channel from the input end to the output end thereof, and
    (d) releasing said mass of particulate solids from the output end of said discharge channel across a throttle element into a zone of significantly reduced pressure as compared to the pressure in the high pressure zone, the discharge pressure being in the range of rear atmospheric pressure to 100 psig, with the further proviso that the pressure drop via the throttle element is small as compared to the pressure drop along the discharge channel achieved by means of the frictional contact of the mass of particulate solids with the wall confining the discharge channel.

* * * * *

UNITED STATES PATENT AND TRADEMARK OFFICE
CERTIFICATE OF CORRECTION

PATENT NO. : 4,397,731
DATED : August 9, 1983
INVENTOR(S) : F. Morgan Warzel

It is certified that error appears in the above—identified patent and that said Letters Patent is hereby corrected as shown below:

Claim 1, col. 6, line 36, "communications" should be --- communication ---.
Claim 3, col. 6, line 64, "ange" should be --- range ---.
Claim 4, col. 6, line 67, "throtte" should be --- throttle ---.
Claim 5, col. 7, line 10, "measure" should be --- measured ---.
Claim 8, col. 7, line 27, "10,000 lpsig" should be --- 10,000 psig ---.
Claim 12, col. 8, line 18, "and" should be --- said ---.
Claim 12, col. 8, line 19, "signals" should be --- signal ---.
Claim 13, col. 8, line 48, "rear" should be --- near ---.

Signed and Sealed this

First Day of November 1983

[SEAL]

Attest:

GERALD J. MOSSINGHOFF

Attesting Officer

Commissioner of Patents and Trademarks